E. E. BRADLEY.
GEARING.
APPLICATION FILED APR. 19, 1913.
1,120,266.
Patented Dec. 8, 1914.
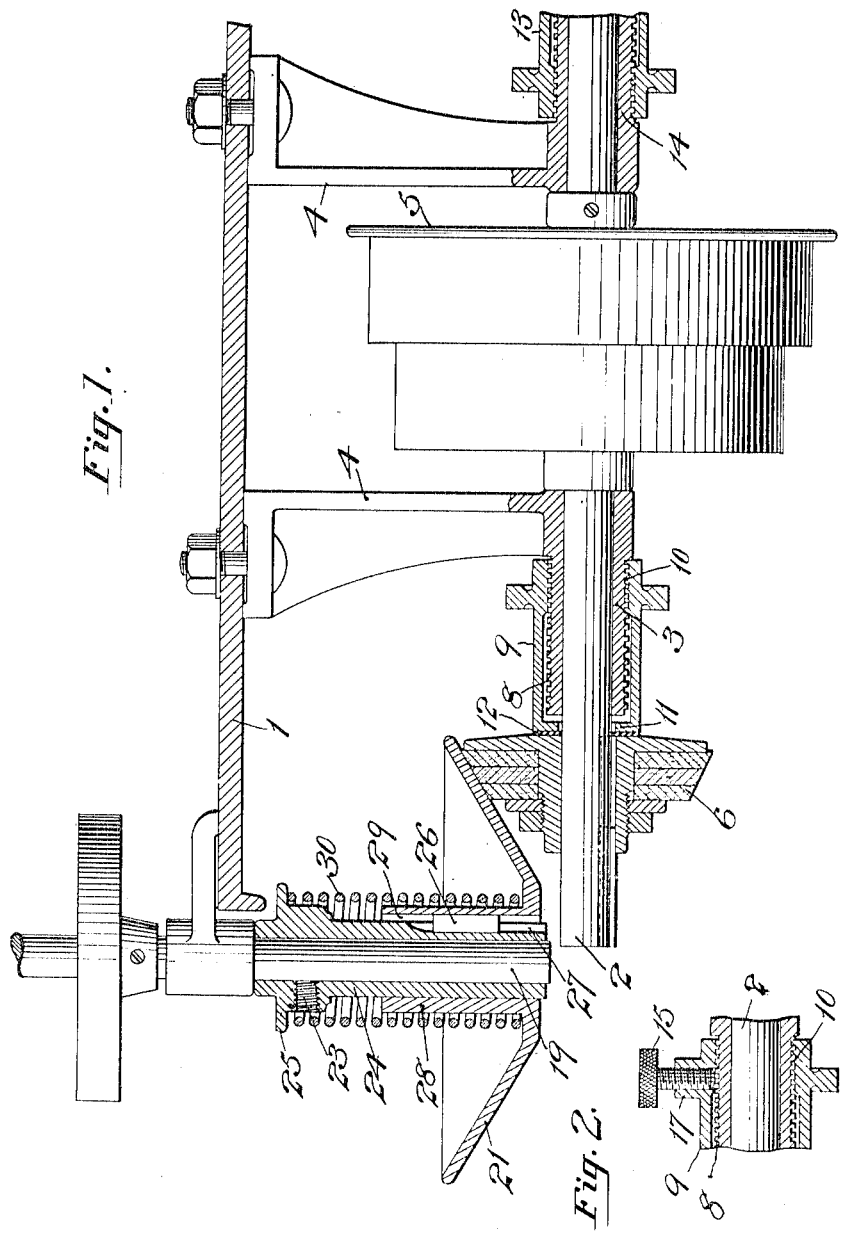

UNITED STATES PATENT OFFICE.

EDWARD E. BRADLEY, OF STONINGTON, CONNECTICUT, ASSIGNOR TO THE ATWOOD MACHINE COMPANY, OF STONINGTON, CONNECTICUT, A CORPORATION OF NEW JERSEY.

GEARING.

1,120,266.  Specification of Letters Patent.  Patented Dec. 8, 1914.

Application filed April 19, 1913. Serial No. 762,377.

*To all whom it may concern:*

Be it known that I, EDWARD E. BRADLEY, a citizen of the United States, and resident of Stonington, in the county of New London and State of Connecticut, have invented a new and useful Improvement in Gearing, of which the following is a specification.

My invention relates to gearing, the object being to provide a drive the speed of which may be conveniently and accurately adjusted and in which the wear and tear shall be reduced to a minimum.

I have chosen to illustrate my invention gearing for a winding frame suitable for rewinding silk from the skein.

In the accompanying drawings, Figure 1 is a horizontal section through the gearing and portion of the winding frame, and Fig. 2 is a partial vertical section in detail.

The frame of the machine is denoted by 1. The drive shaft is denoted by 2. It is journaled in elongated bearings in the ends of bracket arms extending outwardly from the upper portion of the end of the main frame. These bearings are denoted by 3. The arms in which they are formed are denoted by 4. At its central portion the shaft 2 has fixed thereon a stepped pulley 5 for receiving a driving belt from a suitable source of power, and near its opposite ends, cone-shaped driving pulleys such as the pulley 6 are keyed on the shaft to rotate with the shaft but capable of a sliding movement along the shaft. The bearing 3, or that portion of it which projects toward the end of the shaft 2 from the arm 4, is provided with an external screw-thread 8. A tubular nut 9 has an internal screw thread 10 which registers with the external screw-thread 8, in the bearing 3, the outer end of the nut 9 being preferably provided with an inwardly projecting annular lip 11, overlapping the end of the bearing 3. A washer 12 is interposed between the end of the nut 9 and the back of the cone pulley 6. In like manner, a tubular nut 13 corresponding to the nut 9, is in screw-threaded engagement with a bearing 14 corresponding to the bearing 3 on the opposite side of the stepped pulley 5, in position to press against the back of a cone pulley corresponding to the pulley 6. The nuts 9 and 13 are held in the desired adjustment by set screws such as 15 engaged in internally screw-threaded bosses such as 17 on the walls of the nuts.

Motion is transmitted from the cone pulley 6 to a winding shaft 19 extending longitudinally of the machine, by means of a cone-faced wheel or drum 21. The cone-faced pulley on the opposite end of the shaft 2 also engages a cone-faced wheel or drum like the wheel or drum 21; hence a description of one will suffice.

On the end of the shaft 19, there is secured by means of a set screw 23, a sleeve 24, having a flange 25, on its inner end. A key 26 is secured in a seat 27 formed in the wall of the sleeve and the extended, inwardly directed hub 28 of the wheel or drum 21, has a groove 29 to receive the key 26 and thereby permit the wheel or drum 21 to slide longitudinally along the sleeve 24, while locking it against a rotary movement thereon. A coil spring 30 is interposed between the flange 25, on the sleeve and the back of the wheel or drum 21, tending to force the wheel or drum toward the end of the shaft and into frictional contact with the face of the cone pulley 6.

The structure is such that by turning the tubular nut 9, the cone pulley 6 may be forced toward the center of the wheel or drum 21 and the speed of the latter thereby increased, while the speed of the pulley 6 remains constant, and this relative rate of speed can be determined with great exactness because of its control by the nut 9. The wheel or drum 21 will yield just what is required to permit the cone pulley 6 to advance and no more.

What I claim is:

1. A shaft, a sleeve fixed to the shaft and provided with a flange, a cone-faced wheel or drum connected to rotate with the sleeve and free to move along the sleeve, a spring interposed between the flange on the sleeve and the wheel or drum and means for engaging the face of the wheel or drum to rotate it.

2. A shaft, a sleeve fixed to the shaft and provided with a key seat and key secured therein, a cone-faced wheel or drum provided with a hub adapted to embrace the sleeve and provided with a groove for receiving the said key, thereby causing the sleeve and hence the shaft to rotate with the wheel or drum while the latter is free to move along the sleeve, a spring tending to force the wheel or drum in the direction in which the cone-face is directed and means engaged with the said cone-face for rotating the wheel or drum.

3. A shaft, a cone-faced wheel or drum connected to rotate with the shaft, a drive shaft, a cone-faced pulley connected to rotate therewith and free to move along the shaft in engagement with the cone-faced wheel or drum on the winding shaft, an externally screw-threaded bearing for the drive shaft and a tubular nut engaged therewith and arranged to push the cone pulley along the face of the said wheel or drum.

4. A drive shaft, an externally screw-threaded bearing for the drive shaft, a drive pulley connected to rotate with the shaft and free to move along the shaft, a tubular nut engaged with the said bearing and adapted to force the pulley along the shaft and means in coöperative relation to the said pulley for transmitting motion.

5. A drive shaft, a fixed externally screw-threaded part surrounding the shaft, a pulley connected to rotate with the shaft and free to move along the shaft, a tubular nut engaged with said externally screw-threaded part and arranged to force the pulley along the shaft, means for locking the nut in position and means in coöperative relation to the said pulley for transmitting motion.

In testimony, that I claim the foregoing as my invention, I have signed my name in presence of two witnesses, this 18th day of April, 1913.

EDWARD E. BRADLEY.

Witnesses:
F. GEORGE BARRY,
C. S. SUNDGREN.